(12) United States Patent
Matsuda

(10) Patent No.: US 11,836,567 B1
(45) Date of Patent: Dec. 5, 2023

(54) WIRELESS TAG ATTACHING DEVICE AND SYSTEM

(71) Applicant: TOSHIBA TEC KABUSHIKI KAISHA, Tokyo (JP)

(72) Inventor: Okiharu Matsuda, Susono Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/952,412

(22) Filed: Sep. 26, 2022

(51) Int. Cl.
*G06K 7/10* (2006.01)
*G06K 19/077* (2006.01)

(52) U.S. Cl.
CPC ... *G06K 7/10366* (2013.01); *G06K 19/07758* (2013.01)

(58) Field of Classification Search
None
See application file for complete search history.

(56) References Cited

U.S. PATENT DOCUMENTS

2005/0139667 A1* 6/2005 Barrus ............... G06K 7/10346 235/432
2007/0248396 A1* 10/2007 Blanchard, Jr. ........ B65H 23/34 400/621

FOREIGN PATENT DOCUMENTS

EP 3576005 A1 * 12/2019 ............. B41J 29/38
JP 2009-73632 4/2009

* cited by examiner

*Primary Examiner* — Kristy A Haupt
(74) *Attorney, Agent, or Firm* — AMIN, TUROCY & WATSON, LLP

(57) ABSTRACT

According to one embodiment, a wireless tag attaching device includes a setting unit configured to set a tag roll sheet that includes a plurality of wireless tags wound in a roll, a head configured to write tag information to the wireless tag pulled out from the set tag roll sheet, an entry detection unit configured to detect the sheet printed with print information on a front surface thereof entering, an attaching unit configured to attach the wireless tag written with the tag information by the head to the sheet, a tag information reception unit configured to receive tag information related to the print information, and a tag control unit configured to write, using the head, the received tag information to the pulled-out wireless tag, and attach, using the attaching unit, the wireless tag completed with writing to the sheet that is detected as entering by the entry detection unit.

20 Claims, 12 Drawing Sheets

WIRELESS TAG ATTACHING DEVICE AND SYSTEM

FIELD

Embodiments described herein relate generally to a wireless tag attaching device and a system.

BACKGROUND

There are printers such as thermal printers and the like that print information on sheets such as labels attached to products, product tags attached to products as price tags of the products, or the like. In these printers, a roll paper to be used as a label or a product tag is set in the printer, and the set roll paper is pulled out and information is printed on it.

In addition, if such a printer prints a sheet attached with a wireless tag that can store information, a tag roll paper (label or product tag+IC chip+antenna), that is, a roll paper embedded with a plurality of wireless tags (IC chips+antennas) aligned therein, is set in the printer. Then, the printer pulls out the sheet attached with the wireless tag from the set tag roll paper, first writes the tag information on the wireless tag, and then prints print information related to the corresponding tag information on the front surface side of the sheet on which the tag information is written to form a wireless tag sheet.

In this way, when forming a wireless tag sheet, the printer needs to use expensive tag roll paper in which a plurality of wireless tags are embedded in the sheet.

DETAILED DESCRIPTION

In general, according to one embodiment, a wireless tag attaching device which forms a wireless tag sheet without using a tag roll paper and a system are provided.

A wireless tag attaching device according to first and second exemplary embodiments may include a setting unit configured to set a tag roll sheet that includes a plurality of wireless tags wound in a roll, a head provided on a first conveyance path for conveying a wireless tag pulled out from the set tag roll sheet, in which the head may be configured to write tag information to the wireless tag, an entry detection unit provided on a second conveyance path for conveying a sheet printed with print information on a front surface thereof, in which the entry detection unit may be configured to detect the sheet entering the second conveyance path from outside, an attaching unit provided at a position accessible to the first conveyance path and the second conveyance path, in which the attaching unit may be configured to attach the wireless tag written with the tag information by the head to the sheet, a tag information reception unit configured to receive tag information related to the print information, and a tag processor, in which the tag processor may be configured to control the head to write the tag information received by the tag information reception unit to the wireless tag, and control the attaching unit to attach the wireless tag completed with writing to the sheet that is detected as entering by the entry detection unit.

Embodiments will be described with reference to the accompanying drawings. In the embodiments, a label will be described as an example of a sheet. In addition, a label printer will be described as an example of a printer. In addition, a CPU will be described as an example of a processor. Note that the embodiments described below are exemplary embodiments of the wireless tag attaching device, and the configuration, functions, and the like thereof are not to be construed as limiting.

First Embodiment

Figure 1:
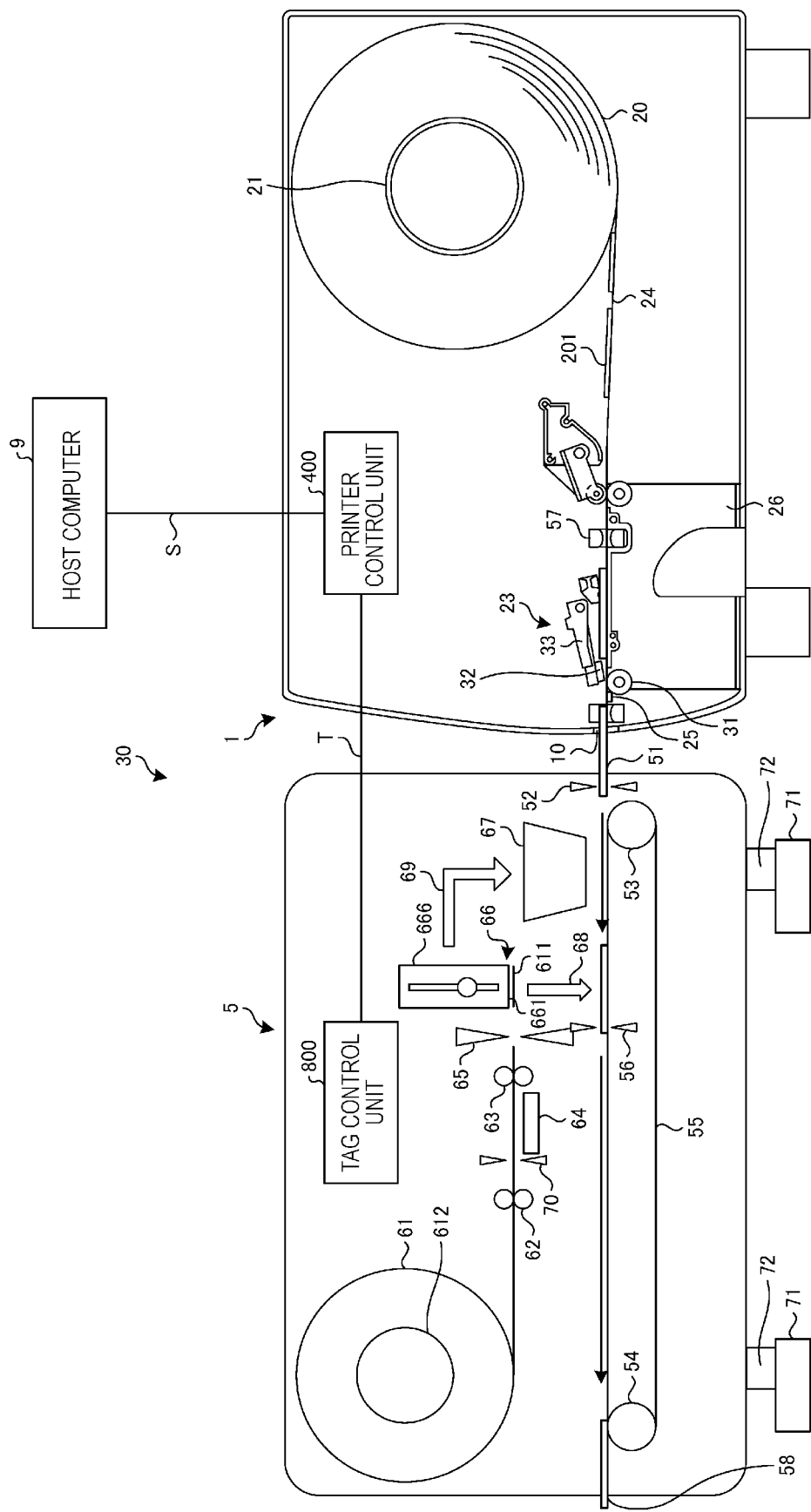
FIG. 1 is an explanatory diagram of a system of a first embodiment.

FIG. 1 illustrates a system 30 of a first embodiment. Referring to FIG. 1, the system 30 of the first embodiment includes a label printer 1 (printer) and a wireless tag attaching device 5.

In FIG. 1, the label printer 1 mainly includes, inside its housing, a paper holding unit 21, a printing unit 23, and a frame 26.

The paper holding unit 21 is a shaft on which a label paper 20 wound in a roll together with a backing paper is set. The label paper 20 is pulled out from the paper holding unit 21, printed by the printing unit 23, and then discharged from a label issuing port 10. An example of the label paper 20 that can be used is the one in which a plurality of labels 201 are aligned and attached in the pull-out direction on the backing paper. The label 201 has a front surface side on which information is printed, and an adhesive side (back surface side), in which the adhesive side is attached to the backing paper. The label 201 is peeled off from the backing paper, and the adhesive side is attached to a product, for example. Note that the label 201 may be a linerless label, that is, it may not be attached to the backing paper. The label 201 also has a front surface side and an adhesive side.

A conveyance path 24 is a path along which the label paper 20 pulled out from the paper holding unit 21 is conveyed to the positions of a print head 32 and a platen 31, which will be described below. In addition, the conveyance path 24 also has a label detection sensor 57 configured to detect the label 201 that is pulled out. The label detection sensor 57 is positioned in the conveyance path 24, for example, between the position where the label 201 is pulled out and the print head 32 and the platen 31, which will be described below.

A label peeling plate 25 is provided downstream of the printing unit 23 in the conveyance direction in the conveyance path 24. The label peeling plate 25 bends the backing paper of the label paper 20 being conveyed at an acute angle to separate the label 201 from the backing paper. While the backing paper is wound around a winding shaft (not illustrated), the label 201 peeled off from the backing paper is issued from the label issuing port 10.

The printing unit 23 has the print head 32 and the platen 31. The print head 32 is a line-type thermal head in which heating elements are arranged in a line in a direction substantially perpendicular to the conveyance direction of the label 201 (that is, the width direction of the label 201). The platen 31 having a cylindrical shape is rotatably attached to the frame 26 and is driven in rotation by a conveying motor or the like.

The print head 32 is fixed to a head holding unit 33 rotatably attached to a frame (not illustrated). The print head 32 is urged in a direction to press against the platen 31 in accordance with the rotational movement of the head holding unit 33, and contacts and separates from the platen 31. The label printer 1 has a head-up mechanism for raising the print head 32 and a head contact mechanism for bringing the print head 32 into contact with the platen 31 (both not illustrated). If the head-up mechanism is operated, the print head 32 is separated from the platen 31, and if the head contact mechanism is operated, the print head 32 is urged (pressed) toward and in contact with the platen 31. If the label 201 passes between the print head 32 and the platen 31 that are in contact with each other, the print head 32 prints print information on the front surface side of the label 201 (on the side facing the print head 32 and opposite to the adhesive surface). For example, the print information is data information related to the product to which the label 201 is attached, such as product specification information for specifying the product, product name, product price, shop information, and the like.

The label printer 1 also includes a printer control unit 400. The printer control unit 400 controls the operation of the label printer 1. The printer control unit 400 will be described below.

Next, the wireless tag attaching device 5 will be described. The wireless tag attaching device 5 is a device that writes tag information on a wireless tag 611 and attaches the wireless tag 611 written with the tag information onto the front surface side of the label 201.

Figure 3:
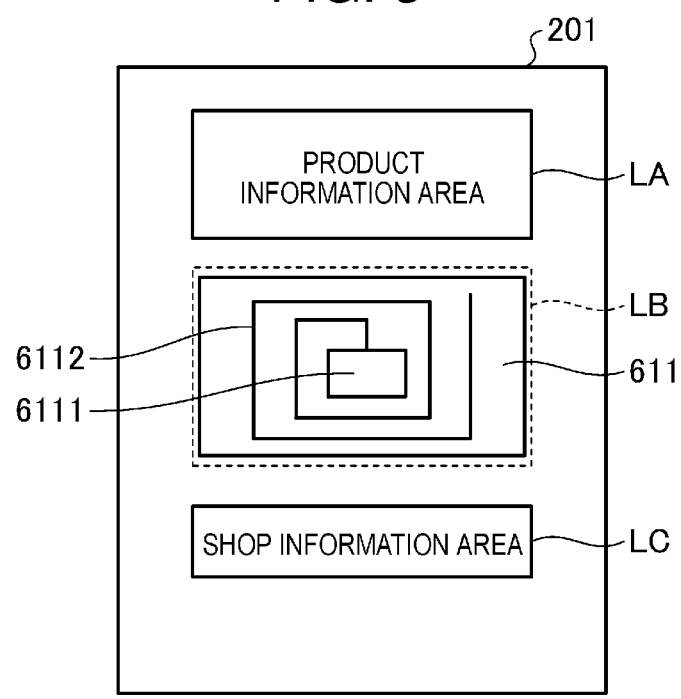
FIG. 3 illustrates a wireless tag label, that is, a label attached with a wireless tag by a wireless tag attaching device.

As illustrated in FIG. 3, the wireless tag 611 is formed by embedding, in the backing paper, an IC chip 6111 for storing information and an antenna 6112 for transmitting and receiving information. The wireless tag 611 stores information received by the antenna 6112 in the IC chip 6111 and transmits the information stored in the IC chip 6111 from the antenna 6112. For example, the wireless tag 611 stores data of product information (individual product specification information for specifying each product, product specification information for specifying product type, product name, product price, shop information, and the like) as tag information.

In FIG. 1, the wireless tag attaching device 5 mainly includes, inside its housing, a wireless tag holding unit 612 (setting unit), a head 64, and an attaching unit 66. The wireless tag holding unit 612 is a shaft that holds a tag roll sheet 61 that is formed by winding a plurality of wireless tags 611 embedded in a tag sheet (backing paper) into a roll. Note that the tag roll sheet 61 is different from the tag roll paper described above as it does not include a label.

The wireless tag attaching device 5 also includes a wireless tag conveying unit 62, a wireless tag conveying unit 63, and a tag detection sensor 70. The wireless tag conveying unit 62 is a roller that conveys the tag sheet embedded with the plurality of wireless tags 611 that is pulled out from the tag roll sheet 61 held by the wireless tag holding unit 612 toward the head 64. That is, the wireless tag conveying unit 62 pulls out the wireless tag 611 from the tag roll sheet 61 and conveys the same. The tag detection sensor 70 detects the wireless tag 611 being conveyed. The wireless tag 611 detected by the tag detection sensor 70 is stopped at a predetermined position facing the head 64. The head 64 transmits (emits) radio waves including the corresponding information in order to write (store) the information in the wireless tag 611 (more precisely, the IC chip 6111) stopped at the predetermined position. In the wireless tag 611, the radio waves transmitted from the head 64 are received by the antenna 6112 and information is written (stored) in the IC chip 6111. The wireless tag conveying unit 63 is a roller for conveying the wireless tag 611 written with the tag information by the head 64.

The wireless tag attaching device 5 also includes a cutter 65. The wireless tag 611 storing the tag information is conveyed by the wireless tag conveying unit 63 to a position to be cut by the cutter 65. The conveyed wireless tag 611 is cut together with the backing paper by the cutter 65. The cut wireless tag 611 has one IC chip 6111 and one antenna 6112 as illustrated in FIG. 3.

The wireless tag attaching device 5 also includes a cylinder 666 as the attaching unit 66. The cylinder 666 has a suction unit 661 at its leading edge. The suction unit 661 sucks the wireless tag 611 cut by the cutter 65 to the cylinder 666. In addition, the cylinder 666 can be moved by an arm (not illustrated). The cylinder 666 is movable in the direction of an arrow 68 by driving the arm. The cylinder 666 is movable in the direction of an arrow 69 by driving the arm. The cylinder 666 moves the wireless tag 611 sucked by the suction unit 661 in the direction of the arrow 68 to attach the wireless tag 611 to the front surface side of the label 201.

The wireless tag attaching device 5 also includes a disposal box 67 (disposal unit). The disposal box 67 is a box for discarding the wireless tag 611 with a failed writing of tag information by the head 64. If the writing of information to the wireless tag 611 fails, the cylinder 666 moves the corresponding wireless tag 611 sucked by the suction unit 661 in the direction of the arrow 69 to discard the same into the disposal box 67. Thus, the wireless tag 611 with incorrect writing of the tag information is not attached to the label 201. A first conveyance path is a path along which the wireless tag 611 pulled out from the tag roll sheet 61 is conveyed to the cylinder 666. The wireless tag conveying unit 62, the tag detection sensor 70, the head 64, the wireless tag conveying unit 63, and the cutter 65 are arranged on the first conveyance path. The attaching unit 66 is provided at a position (accessible position) where the cylinder 666 can move from the first conveyance path to a second conveyance path described below.

The wireless tag attaching device 5 also includes a label detection sensor 52 (entry detection unit). The label detection sensor 52 detects the label 201 (as an example of a sheet) entering from an entry opening 51. That is, the label detection sensor 52 detects that the label 201 enters the wireless tag attaching device 5.

The wireless tag attaching device 5 also includes a drive wheel 53 and a driven wheel 54 below the head 64 and the cylinder 666, and an endless belt 55 stretched over the drive wheel 53 and the driven wheel 54. The endless belt 55, which is rotated as the drive wheel 53 is driven by a belt drive unit 551 (see FIG. 5), conveys the label 201 entering the wireless tag attaching device 5.

The wireless tag attaching device 5 also includes a label leading edge sensor 56. The label leading edge sensor 56 detects the leading edge of the label 201 conveyed by the endless belt 55. The label 201 having the leading edge detected by the label leading edge sensor 56 is stopped at the detected position. The cylinder 666 with the sucked wireless tag 611 is moved in the direction of the arrow 68 (that is, from top to bottom of the wireless tag attaching device 5) to the second conveyance path with respect to the front surface side of the label 201 stopped at this attaching position, and attaches the sucked wireless tag 611. Attaching the wireless tag 611 to the label 201 is performed by stopping sucking the wireless tag 611 with the cylinder 666 and by blowing the corresponding wireless tag 611 onto the label 201, for example. As a result, the label 201 (that is, the wireless tag label as well as the example of the wireless tag sheet) is formed, attached with the wireless tag 611 that has tag information written therein. The label 201 attached with the wireless tag 611 is conveyed by the endless belt 55 and issued to the outside of the wireless tag attaching device 5 from a discharge port 58. The issued label 201 is attached to the product automatically or by a person. The second conveyance path is a path along which the label 201 that enters the entry opening 51 is conveyed before being issued from the discharge port 58. The label detection sensor 52, the label leading edge sensor 56, and the endless belt 55 are arranged on the second conveyance path.

The wireless tag attaching device 5 also includes a tag control unit 800. The tag control unit 800 controls the operation of the wireless tag attaching device 5. The tag control unit 800 will be described below.

Further, the wireless tag attaching device 5 has, for example, four legs 71 for setting the device main body on a plane. Each of the legs 71 includes a height adjustment unit 72 for varying the height of the device main body from the legs 71. By rotationally driving the adjustment unit 72, the height of the wireless tag attaching device 5 can be varied. By adjusting the height of the wireless tag attaching device 5 and making the height of the label issuing port 10 and the height of the entry opening 51 approximately the same, the label 201 issued from the label issuing port 10 can easily enter the entry opening 51.

In FIG. 1, a host computer 9 is a computer that transmits print information and tag information to the label printer 1. The label printer 1 and the host computer 9 are electrically connected by a communication line S such as a wired line, a wireless line, the Internet, or the like, and the label printer 1 and the host computer 9 can transmit and receive information via the communication line S. Further, the label printer 1 and the wireless tag attaching device 5 are electrically connected by a communication line T such as a wired line, a wireless line, or the like, and the label printer 1 and the wireless tag attaching device 5 can transmit and receive information via the communication line T.

In the system 30, the label printer 1 and the wireless tag attaching device 5 are installed adjacent to each other, with the label issuing port 10 and the entry opening 51 having approximately the same height. The label paper 20 is set in the label printer 1 and the tag roll sheet 61 is set in the wireless tag attaching device 5. The label printer 1 receives the print information and the tag information from the host computer 9. The printer control unit 400 of the label printer 1 drives the platen 31, the print head 32, and the like, prints the print information on the front surface side of the conveyed label 201, and issues the label from the label issuing port 10. The wireless tag attaching device 5 receives the tag information from the label printer 1 at a timing when the label 201 is issued. Then, the tag control unit 800 of the wireless tag attaching device 5 drives the wireless tag conveying unit 62, the head 64 and the like, and writes the tag information to the wireless tag 611 pulled out from the tag roll sheet 61. Then, the tag control unit 800 drives the cutter 65, the cylinder 666, and the like and forms a wireless tag label, that is, the label 201 entering from the entry opening 51 and attached with the wireless tag 611 written with the tag information on the front surface side thereof.

Figure 2:
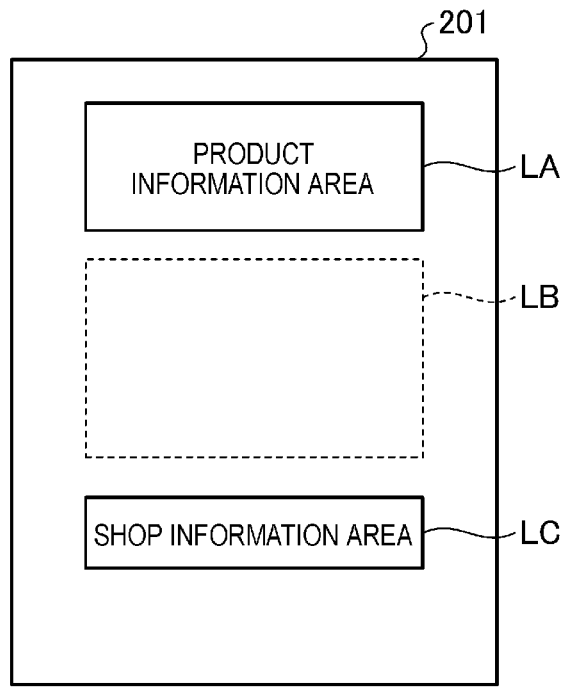
FIG. 2 illustrates a configuration of a label issued by a label printer.

Hereinafter, the label 201 printed with the print information and issued by the label printer 1 will be described. FIG. 2 illustrates a configuration of the label 201 issued by the label printer 1. The front surface side of the label 201 includes an area LA printed with print information related to a product to be attached with the label 201, an area LB attached with the wireless tag 611, and an area LC printed with shop information (print information) of a shop that issues the label 201. In FIG. 2, the area LB is blank because the wireless tag 611 is not attached yet. The print information in area LA and the print information in area LC are printed at positions excluding the area LB.

Next, the label 201 issued by the wireless tag attaching device 5 will be described. FIG. 3 illustrates a wireless tag label, that is, the label 201 attached with a wireless tag by the wireless tag attaching device 5. In FIG. 3, the area LB of the label 201 is attached with the wireless tag 611 written with the tag information. The label 201 in this state is referred to as the wireless tag label.

Figure 4:
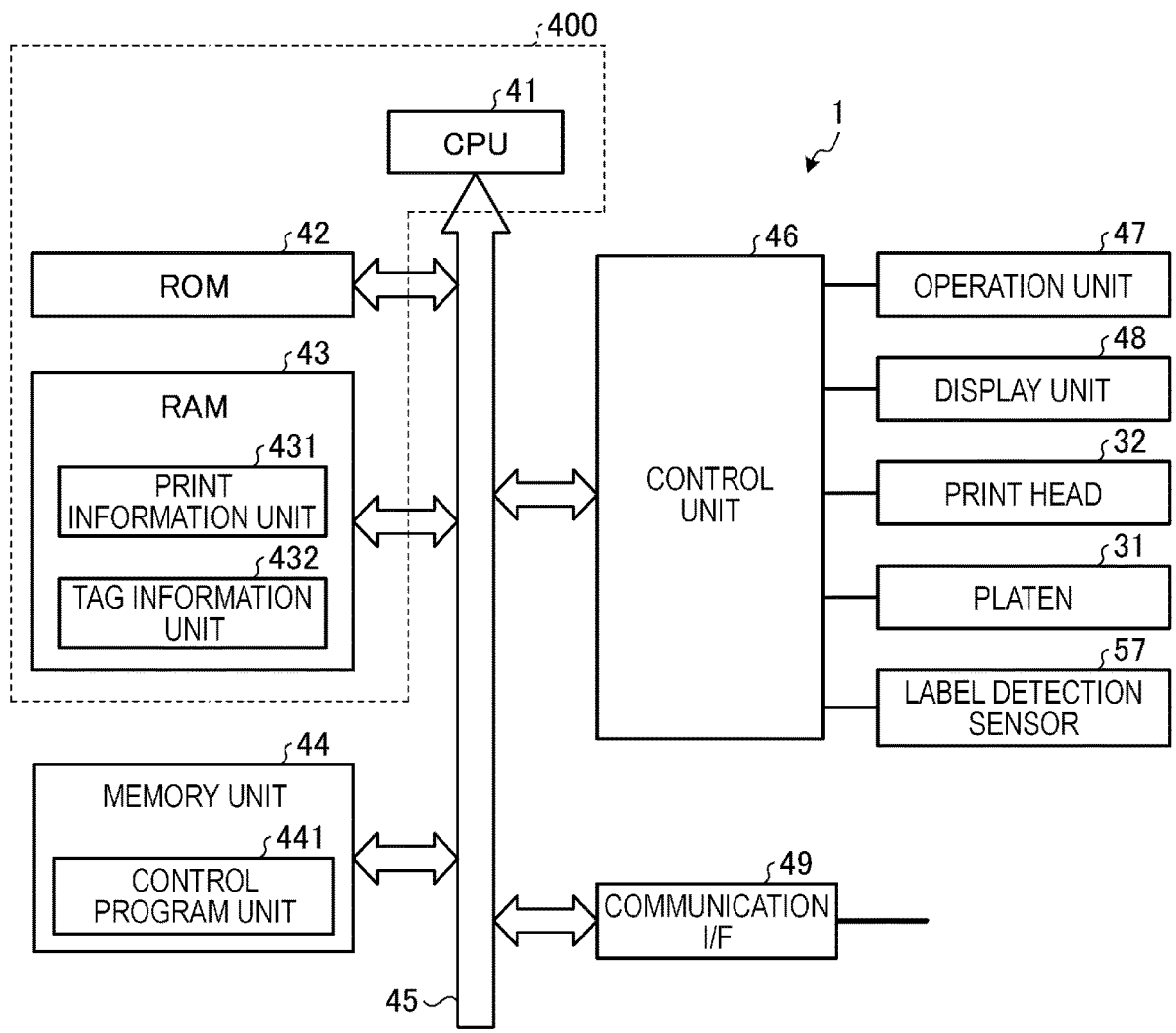
FIG. 4 is a block diagram illustrating a hardware configuration of a label printer.

Hereinafter, the hardware configuration of the label printer 1 will be described. FIG. 4 is a block diagram illustrating a hardware configuration of the label printer 1. As illustrated in FIG. 4, the label printer 1 includes a Central Processing Unit 41 (CPU) (printer processor) as an example of a processor, a Read Only Memory 42 (ROM), a Random Access Memory 43 (RAM), a memory unit 44, and the like. The CPU 41 is a control main body. The ROM 42 stores various programs. The RAM 43 loads programs and various data. The memory unit 44 stores various programs. The CPU 41, the ROM 42, the RAM 43, and the memory unit 44 are connected to each other via a bus 45. The printer control unit 400 includes the CPU 41, the ROM 42, and the RAM 43. That is, the printer control unit 400 executes controlling of the label printer 1 described below by the CPU 41 that operates according to the control program stored in the ROM 42 and the memory unit 44 and loaded into the RAM 43. In other words, the CPU 41 executes controlling of the label printer 1 described below by operating according to the control program stored in the ROM 42 and the memory unit 44 and loaded into the RAM 43.

The RAM 43 includes a print information unit 431 and a tag information unit 432. The print information unit 431 stores the print information, received from the host computer 9, to be printed on the label 201. The tag information unit 432 stores the tag information, received from the host computer 9, to be transmitted to the wireless tag attaching device and written to the wireless tag 611.

The memory unit 44 includes an Hard Disc Drive (HDD), a flash memory, or the like, which retains stored data upon power off. The memory unit 44 includes a control program unit 441. The control program unit 441 stores a control program for controlling the label printer 1.

The printer control unit 400 is also connected to an operation unit 47, a display unit 48, the print head 32, the platen 31, and the label detection sensor 57 via the bus 45 and a control unit 46.

The operation unit 47 is a keyboard for operating the label printer 1. The display unit 48 displays information related to the label printer 1 to the operator. The print head 32 prints the print information such as characters, shapes, and the like on the label 201. The platen 31 rotates and conveys the label 201. The label detection sensor 57 is a reflective or transmissive optical sensor that detects the presence or absence of the label 201 conveyed through the conveying unit 24.

The printer control unit 400 is also connected via the bus 45 to a communication interface (I/F) 49 (reception unit). The printer control unit 400 can transmit and receive information with the host computer 9 via the communication interface 49 and the communication line S. In addition, the printer control unit 400 can transmit and receive information with the wireless tag attaching device 5 via the communication interface 49 and the communication line T.

Figure 5:
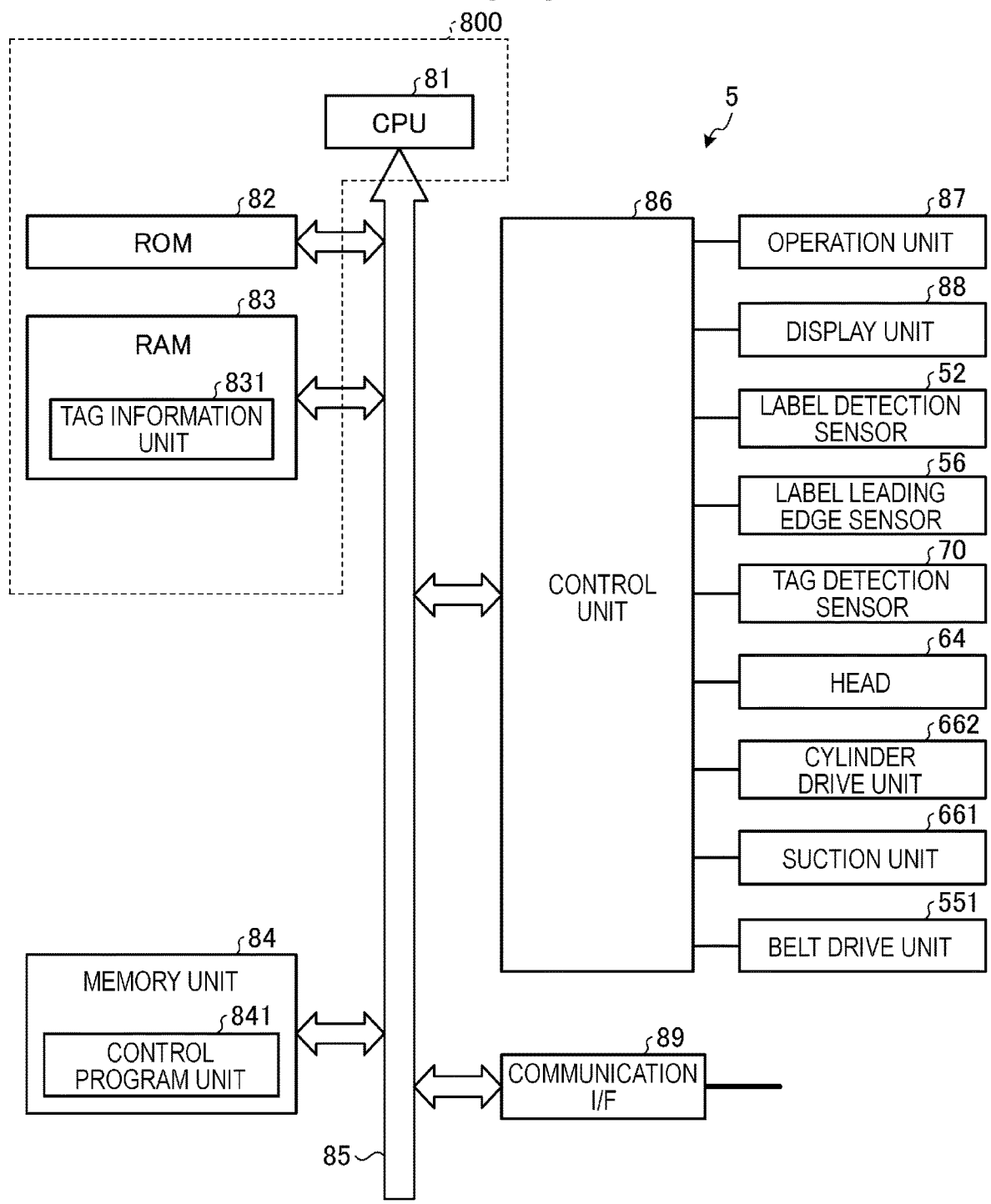
FIG. 5 is a block diagram illustrating a hardware configuration of a wireless tag attaching device.

Hereinafter, the hardware configuration of the wireless tag attaching device 5 will be described. FIG. 5 is a block diagram illustrating a hardware configuration of the wireless tag attaching device 5. As illustrated in FIG. 5, the wireless tag attaching device 5 includes a CPU 81 (tag processor) as an example of a processor, a ROM 82, a RAM 83, a memory unit 84, and the like. The CPU 81 is a control main body. The ROM 82 stores various programs. The RAM 83 loads programs and various data. The memory unit 84 stores various programs. The CPU 81, the ROM 82, the RAM 83, and the memory unit 84 are connected to each other via a bus 85. The tag control unit 800 includes the CPU 81, the ROM 82, and the RAM 83. That is, the tag control unit 800 executes controlling of the wireless tag attaching device 5 described below by the CPU 81 operating according to the control program stored in the ROM 82 or the memory unit 84 and loaded into the RAM 83. That is, the CPU 81 executes controlling of the wireless tag attaching device 5 described below by operating according to the control program stored in the ROM 82 or the memory unit 84 and loaded into the RAM 83.

The RAM 83 includes a tag information unit 831. The tag information unit 831 stores the tag information, received from the label printer 1, to be written to the wireless tag 611.

The memory unit 84 includes an HDD, a flash memory, or the like, which retains stored data upon power off. The memory unit 84 includes a control program unit 841. The control program unit 841 stores a control program for controlling the wireless tag attaching device 5.

The tag control unit 800 is also connected to an operation unit 87, a display unit 88, the label detection sensor 52, the label leading edge sensor 56, the tag detection sensor 70, the head 64, a cylinder drive unit 662, the suction unit 661, and the belt drive unit 551 via the bus 85 and a control unit 86.

The operation unit 87 is a keyboard for operating the wireless tag attaching device 5. The display unit 88 displays information related to the wireless tag attaching device 5 to the operator. The label detection sensor 52 detects that the label 201, which is issued by the label printer 1, enters the wireless tag attaching device 5. The label leading edge sensor 56 detects the label 201 which is conveyed by the endless belt 55 and arrives at the attaching position of the wireless tag 611. The tag detection sensor 70 detects the wireless tag 611 which is pulled out from the tag roll sheet 61 and arrives at the vicinity of the head 64. Note that the label detection sensor 52, the label leading edge sensor 56, and the tag detection sensor 70 are transmissive or reflective optical sensors, for example. The head 64 writes the tag information to the conveyed wireless tag 611 (more precisely, to the IC chip 6111). The cylinder drive unit 662 is a drive unit (for example, a motor) that moves the cylinder 666 in the directions of arrows 68 and 69. The suction unit 661 sucks the wireless tag 611 to the cylinder 666 by applying negative pressure, for example. The sucked wireless tag 611 is moved as the cylinder 666 is moved. If the suction by the suction unit 661 is stopped, sucking the wireless tag 611 by the cylinder 666 is stopped. The belt drive unit 551 drives the endless belt 55 by rotating the drive wheel 53 with the belt drive unit 551.

In addition, the tag control unit 800 is connected to a communication interface (I/F) 89 (tag information reception unit) via the bus 85. The tag control unit 800 can transmit and receive information with the label printer 1 via the communication interface 49 and the communication line T.

Figure 6:
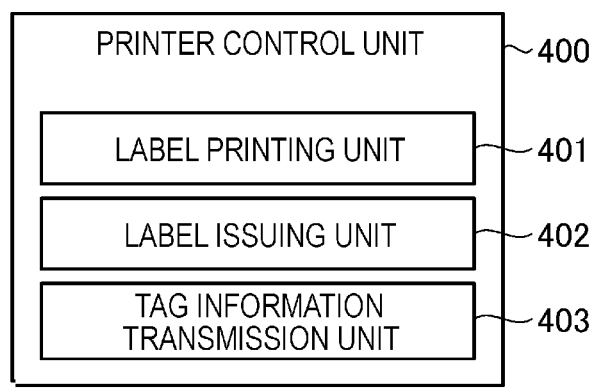
FIG. 6 is a functional block diagram illustrating a functional configuration of a label printer.

Hereinafter, the functional configuration of the label printer 1 will be described. FIG. 6 is a functional block diagram illustrating the functional configuration of the label printer 1. The printer control unit 400 (that is, the CPU 41) of the label printer 1 operates according to the control program stored in the control program unit 441 to function as follows.

That is, the printer control unit 400 has a function of printing the received print information on the label 201 by using the print head 32, issuing the printed label 201, and transmitting the tag information received together with the print information printed on the issued label 201 to the wireless tag attaching device 5. Specifically, the printer control unit 400 serves as, by the CPU 41 cooperating with the ROM 42 and the RAM 43, a label printing unit 401 that prints the print information received by the communication interface 49 on the label 201 using the print head 32, a label issuing unit 402 that issues the printed label 201 from the label printer 1, and a tag information transmission unit 403 that transmits the tag information received together with the print information printed on the issued label 201 to the wireless tag attaching device 5.

Figure 7:
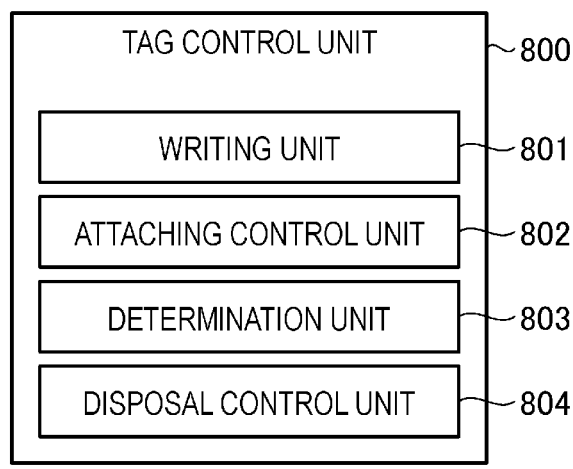
FIG. 7 is a functional block diagram illustrating a functional configuration of a wireless tag attaching device.

Next, the functional configuration of the wireless tag attaching device 5 will be described. FIG. 7 is a functional block diagram illustrating the functional configuration of the wireless tag attaching device 5. The tag control unit 800 (that is, the CPU 81) of the wireless tag attaching device 5 operates according to the control program stored in the control program unit 841 to function as follows.

That is, the tag control unit 800 writes, using the head 64, the received tag information to the pulled-out wireless tag 611, and attaches, using the cylinder 666, the wireless tag 611 completed with writing to the label 201 that is detected as entering by the label detection sensor 52. Specifically, the tag control unit 800 serves as, by the CPU 81 cooperating with the ROM 82 and the RAM 83, a writing unit 801 that writes the tag information received by the communication interface 89 to the wireless tag 611 pulled out from the tag roll sheet 61, and an attaching control unit 802 that attaches, using the cylinder 666, the wireless tag 611 completed with writing to the label 201 that is detected as entering by the label detection sensor 52.

Further, if the label detection sensor 52 detects the sheet entering, the tag control unit 800 also has a function of determining whether or not the communication interface 89 receives the tag information, and if so, writing the corresponding tag information to the wireless tag 611. Specifically, if the label detection sensor 52 detects the sheet entering, the tag control unit 800 serves as a determination unit 803 that determines whether or not the communication interface 89 receives the tag information, and the writing unit 801 writes the corresponding tag information to the wireless tag 611 if it is determined that the tag information is received.

The tag control unit 800 also has a function of discarding the wireless tag 611 in the disposal box 67 if the head 64 fails to correctly write the tag information to the wireless tag 611. Specifically, the tag control unit 800 serves as a disposal control unit 804 that discards the wireless tag 611 in the disposal box 67 if the head 64 fails to correctly write the tag information to the wireless tag 611.

Figure 8:
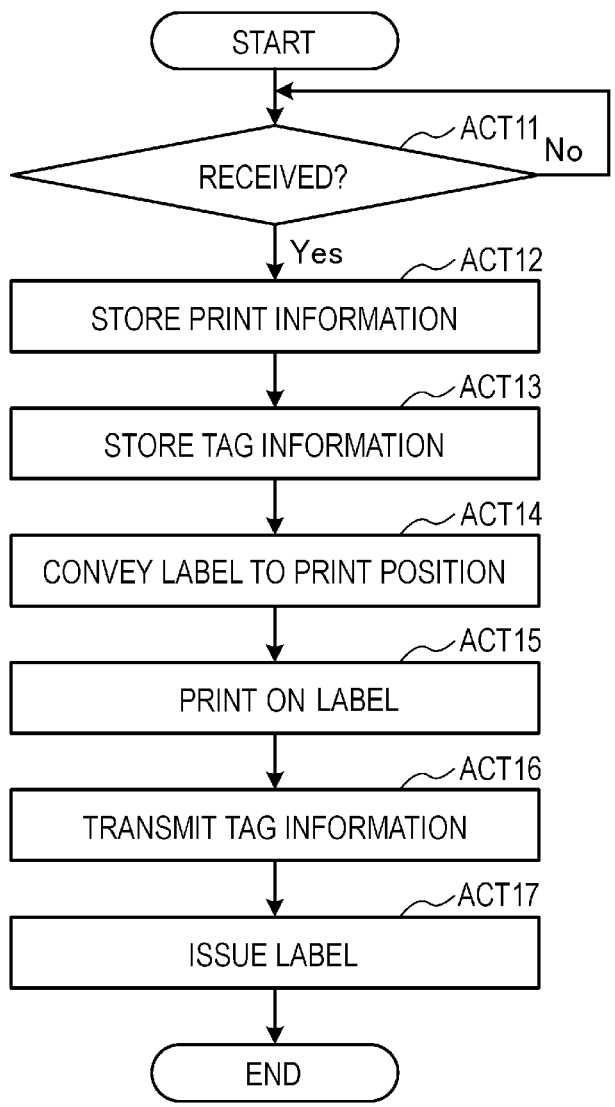
FIG. 8 is a flowchart illustrating a flow of controlling a label printer.

Hereinafter, the control of the label printer 1 will be described. FIG. 8 is a flowchart illustrating the flow of the control process executed by the printer control unit 400 of the label printer 1. As illustrated in FIG. 8, the printer control unit 400 of the label printer 1 determines whether or not the communication interface 49 receives the print information and the tag information transmitted from the host computer 9 (ACT 11). The printer control unit 400 waits until the print information is received (No in ACT 11), and if determining that the communication interface 49 receives the print information and the tag information (Yes in ACT 11), stores the received print information in the print information unit 431 (ACT 12). The printer control unit 400 then stores the received tag information in the tag information unit 432 (ACT 13).

Next, the printer control unit 400 drives the platen 31 and the like to convey the label 201 pulled out from the label paper 20 to a position for printing by the print head 32 (ACT 14). After the label detection sensor 57 detects the label 201, the printer control unit 400 conveys the detected label 201 by a predetermined distance so as to convey the label 201 to the position for printing by the print head 32. Then, the label printing unit 401 prints the print information stored in the print information unit 431 on the front surface of the conveyed label 201 (ACT 15).

Next, the tag information transmission unit 403 transmits the tag information stored in the tag information unit 432 to the wireless tag attaching device 5 (ACT 16). Then, the label issuing unit 402 issues, from the label issuing port 10, the label 201 which is printed with the print information but not yet attached with the wireless tag 611 (ACT 17). Then, the printer control unit 400 ends the process.

Figure 9:
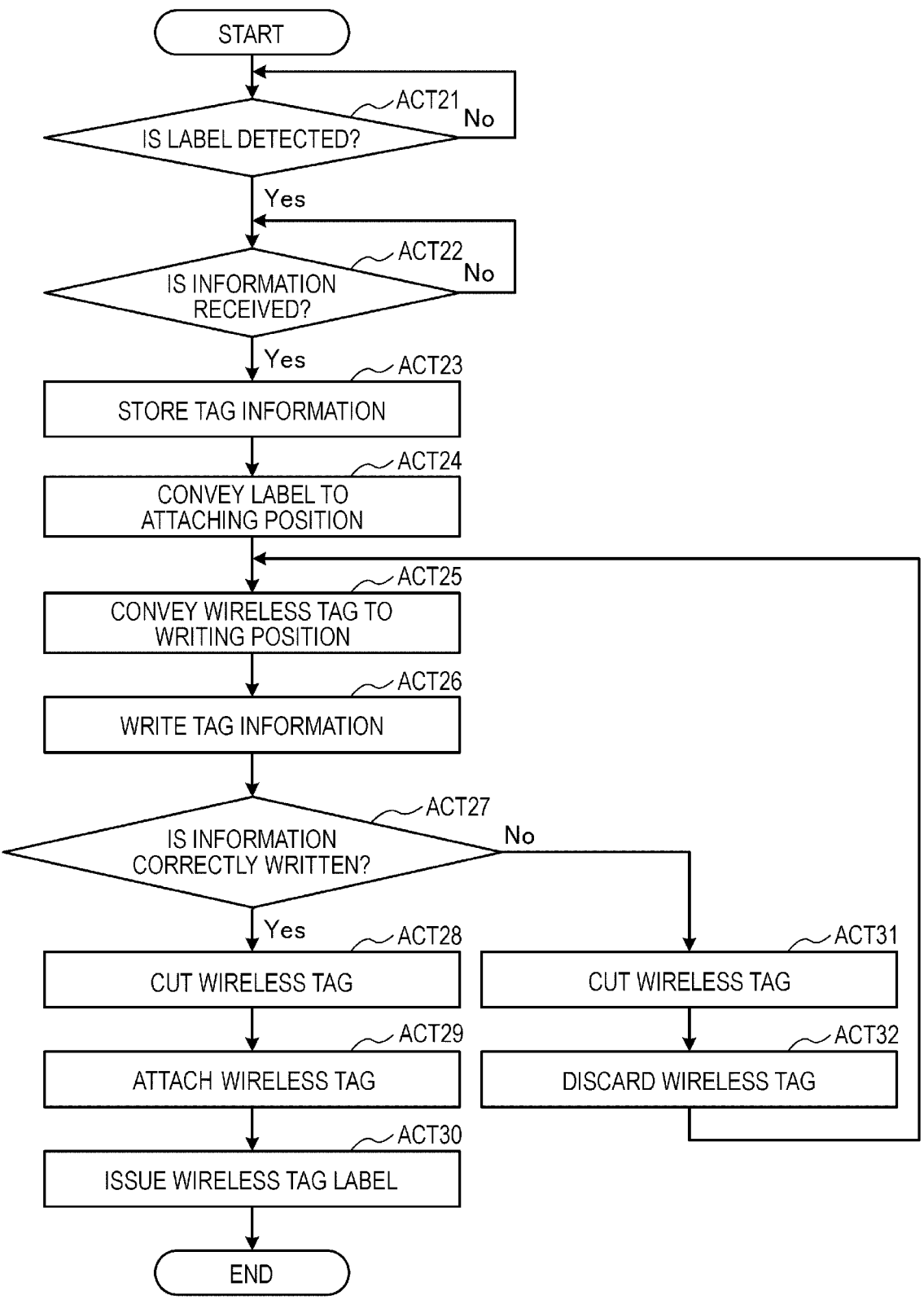
FIG. 9 is a flowchart illustrating a flow of controlling a wireless tag attaching device.

Next, the control of the wireless tag attaching device 5 will be described. FIG. 9 is a flowchart illustrating the flow of the control process executed by the tag control unit 800 of the wireless tag attaching device 5. As illustrated in FIG. 9, the tag control unit 800 of the wireless tag attaching device 5 determines whether or not the label detection sensor 52 detects that the label 201 issued by the label printer 1 from the label issuing port 10 is entered (ACT 21). The determination unit 803 waits until the label 201 is detected as entering (No in ACT 21), and when determining that the label 201 is detected as entering by the label detection sensor 52 (Yes in ACT 21), the determination unit 803 determines whether or not the communication interface 89 receives the tag information (ACT 22). The tag information received in ACT 22 is information including the same information as the print information printed on the label 201 detected as entering in ACT 21 (For example, the information indicates the same product, and is related to the same product as indicated by the print information printed on the label 201). The tag control unit 800 waits until the tag information is received (No in ACT 22), and when determining that the communication interface 89 receives the tag information (Yes in ACT 22), the tag control unit 800 stores the received tag information in the tag information unit 831 (ACT 23).

Next, the tag control unit 800 drives the endless belt 55 to convey the entered label 201 to the attaching position where the wireless tag 611 can be attached (ACT 24). Based on the detection of the label 201 by the label leading edge sensor 56, the tag control unit 800 conveys the corresponding label 201 to the attaching position where the wireless tag 611 can be attached. The label 201 waits at the attaching position.

Next, the tag control unit 800 conveys the wireless tag 611 pulled out from the tag roll sheet 61 to a writing position where the tag information can be written by the head 64 (ACT 25). Based on the detection of the wireless tag 611 by the tag detection sensor 70, the tag control unit 800 conveys the wireless tag 611 to the writing position where the head 64 can write the tag information.

Next, the writing unit 801 writes, using the head 64, the tag information stored in the tag information unit 831 to the wireless tag 611 (more precisely, to the IC chip 6111) (ACT 26). Next, the tag control unit 800 determines whether or not the tag information stored in the tag information unit 831 is correctly written to the wireless tag 611 (ACT 27). The tag control unit 800 reads out the tag information written in the wireless tag 611 and determines whether or not the tag information is correctly written to the wireless tag 611 based on whether or not it matches the tag information stored in the tag information unit 831. If the tag information read from the wireless tag 611 matches the tag information stored in the tag information unit 831, the tag control unit 800 determines that the tag information stored in the tag information unit 831 is correctly written to the wireless tag 611. In addition, if the tag information read from the wireless tag 611 does not match the tag information stored in the tag information unit 831, the tag control unit 800 determines that the tag information stored in the tag information unit 831 is not correctly written to the wireless tag 611 (write failure).

If the tag control unit 800 determines that the tag information stored in the tag information unit 831 is correctly written to the wireless tag 611 (Yes in ACT 27), the tag control unit 800 drives the cutter 65 to cut the wireless tag 611 written with the tag information (ACT 28). Then, the attaching control unit 802 drives the cylinder drive unit 662 and the suction unit 661 to move, using the cylinder 666, the cut wireless tag 611 to the position of the label 201 waiting at the attaching position. The attaching control unit 802 attaches the wireless tag 611 to the area LB (front surface side) of the waiting label 201 (ACT 29). Then, the tag control unit 800 conveys the label 201 (wireless tag label) attached with the wireless tag 611 and issues the label from the discharge port 58 (ACT 30). Then, the tag control unit 800 ends the process.

Meanwhile, if the tag control unit 800 determines that the tag information stored in the tag information unit 831 is not correctly written to the wireless tag 611 (No in ACT 27), the tag control unit 800 drives the cutter 65 to cut the wireless tag 611 written with the tag information (ACT 31). Then, the attaching control unit 802 drives the cylinder drive unit 662 and the suction unit 661 to move, using the cylinder 666, the cut wireless tag 611 to the position of the disposal box 67, and discards the corresponding wireless tag 611 in the disposal box 67 (ACT 32). Then, the tag control unit 800 returns to ACT 25, conveys the next wireless tag 611, and performs the process of ACT 26 and the determination of ACT 27. The label 201 waits at the attaching position until the wireless tag 611 correctly written with the tag information is formed (until it is determined as Yes in ACT 27 and the processes of ACT 28 and ACT 29 are executed).

In addition, while the label 201 is waiting at the waiting position, the tag control unit 800 of the wireless tag attaching device 5 keeps the next label 201 from entering through the entry opening 51. In the label printer 1 in this state, a sensor (not illustrated) detects that the label 201 is not removed from the label issuing port 10. The printer control unit 400 of the label printer 1 stops issuing the next label 201 until the sensor detects that the label 201 is removed from the label issuing port 10.

If the label 201 printed with the print information enters, the wireless tag attaching device 5 of the first embodiment writes the tag information related to the print information to the pulled-out wireless tag 611, and attaches the wireless tag 611 on the front surface side of the entering label 201. Therefore, it is possible to form a wireless tag label without using a tag roll paper.

In the system of the first embodiment, when the label printer 1 prints the print information on the front surface side of the pulled label 201 and issues the label, and if the label 201 issued by the label printer 1 enters, the wireless tag attaching device 5 writes the tag information related to the print information to the pulled-out wireless tag 611 and attaches the wireless tag 611 on the front surface side of the entered label 201. Therefore, it is possible to form a wireless tag label without using a tag roll paper.

Hereinafter, a modification of the first embodiment will be described. While the label printer 1 prints the print information on the front surface side of the label 201, and the wireless tag attaching device 5 attaches the wireless tag 611 on the front surface side of the label 201 in the first embodiment, in the modification, the label printer 1 prints the print information on the front surface side of the label 201, and the wireless tag attaching device 5 attaches the wireless tag 611 on a back surface side (adhesive side) of the label 201.

Figure 10:
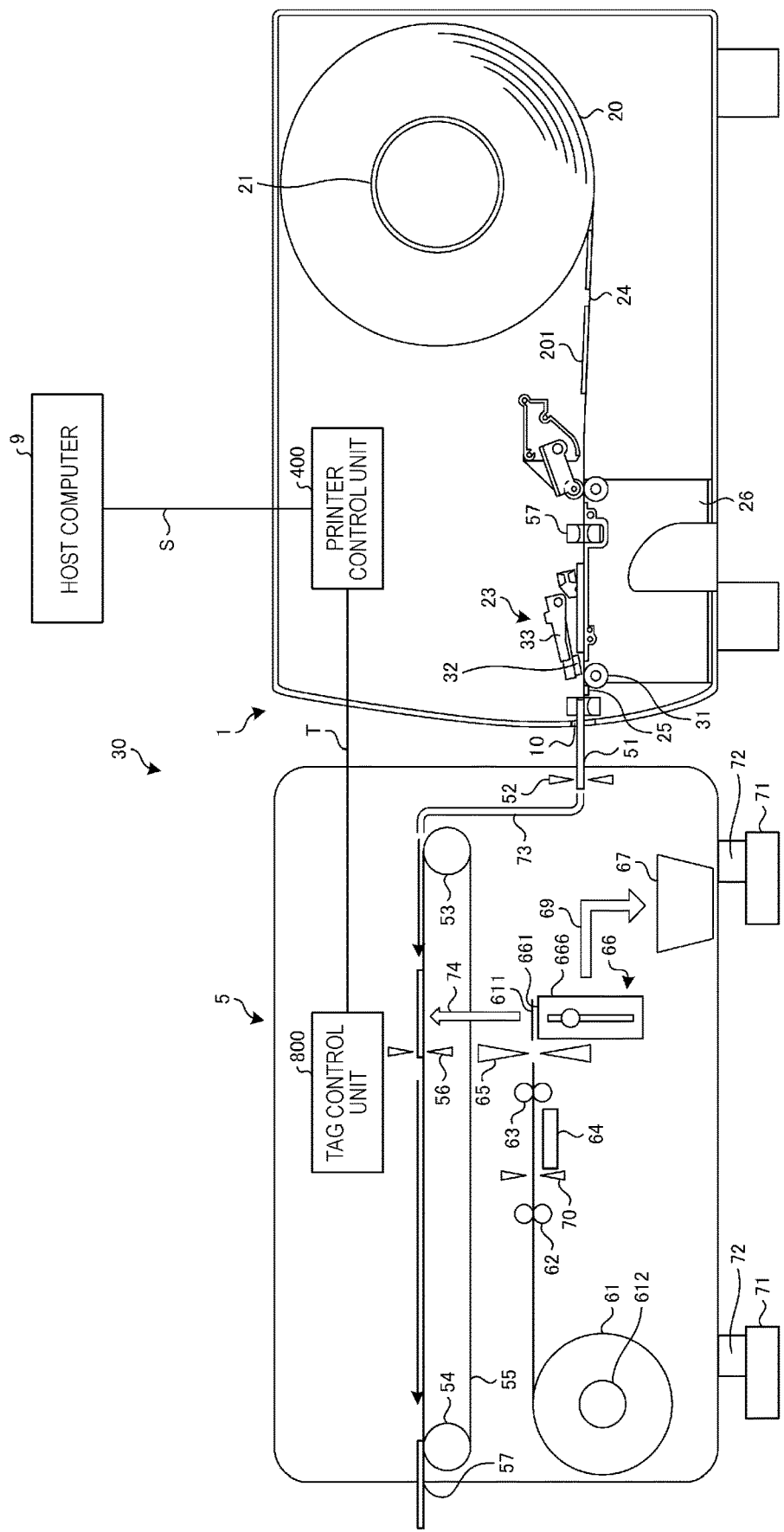
FIG. 10 illustrates a system according to a modification of the first embodiment.

FIG. 10 is an explanatory diagram of a configuration of the label printer 1 and the wireless tag attaching device 5 according to the modification. In the modification of FIG. 10, the configuration of the label printer 1 is the same as that of the first embodiment.

Next, the configuration of the wireless tag attaching device 5 in the modification will be described. The wireless tag attaching device 5 of the modification illustrated in FIG. 10 includes the drive wheel 53, the driven wheel 54, the endless belt 55, and the like provided at positions above the head 64 and the cylinder 666. That is, the label 201 entering from the entry opening 51 is conveyed to an upper position of the wireless tag attaching device 5 by a conversion path 73 and then conveyed by the endless belt 55 in the upper portion of the wireless tag attaching device 5. Then, the cylinder 666 is moved in the direction of an arrow 74 (from bottom to top) with respect to the label 201 waiting at the attaching position, and attaches the wireless tag 611 on the back surface (adhesive side) of the label 201.

If the label 201 printed with the print information enters, the wireless tag attaching device 5 according to the modification of the first embodiment writes the tag information related to the print information to the pulled-out wireless tag 611, and attaches the wireless tag 611 on the back surface side of the entered label 201. Therefore, it is possible to form a wireless tag label without using a tag roll paper.

In the system according to the modification of the first embodiment, if the label printer 1 prints the print information on the front surface side of the pulled label 201 and issues the label, and if the label 201 issued by the label printer 1 enters, the wireless tag attaching device 5 writes the tag information related to the print information to the pulled-out wireless tag 611 and attaches the wireless tag 611 on the back surface side of the entered label 201. Therefore, it is possible to form a wireless tag label without using a tag roll paper.

In addition, in the modification, since the wireless tag 611 is attached to the back surface side of the label 201, it is not necessary to provide the area LB attached with the wireless tag 611 on the front surface side of the label 201. Therefore, the size of the label 201 issued from the label printer 1 can be reduced, thereby reducing the cost per sheet of the label 201.

Second Embodiment

Hereinafter, a second embodiment will be described. In the first embodiment, if the host computer 9 transmits the print information and the tag information to the label printer 1 and the label printer 1 prints the print information on the label 201, the label printer 1 transmits the corresponding tag information to the wireless tag attaching device 5. In the second embodiment, if the host computer 9 transmits the print information to the label printer 1, and the label printer 1 prints the print information on the label 201, the host computer 9 transmits tag information to the wireless tag attaching device 5.

Figure 11:
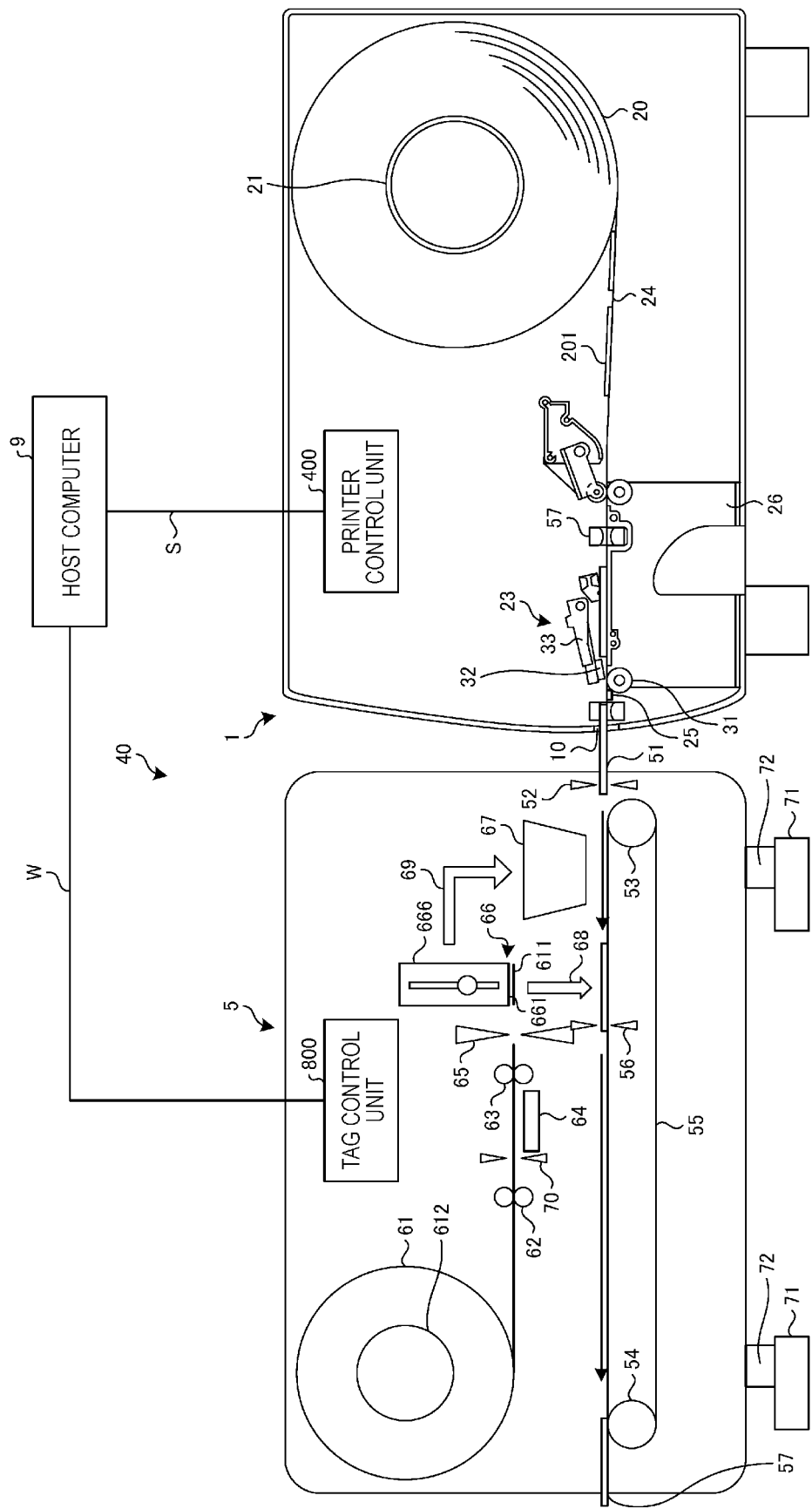
FIG. 11 is an explanatory diagram illustrating a system of a second embodiment.

FIG. 11 is an explanatory diagram of a system 40 according to the second embodiment. As illustrated in FIG. 11, in the second embodiment, the mechanical configurations of the label printer 1 and the wireless tag attaching device 5 are the same as in the first embodiment. Therefore, the same reference numerals as in the first embodiment (the same reference numerals as in FIG. 1) are assigned to the mechanical configurations of the label printer 1 and the wireless tag attaching device 5, and the description thereof is omitted.

In the second embodiment, the system 40 includes the label printer 1, the wireless tag attaching device 5, and the host computer 9. In addition, in the second embodiment, the hardware configuration of the label printer 1 is substantially the same as that in FIG. 4, but the tag information unit 432 is not provided. Further, in the second embodiment, the hardware configuration of the wireless tag attaching device 5 is substantially the same as that of FIG. 5, but the tag information unit 831 stores the tag information received from the host computer 9.

The host computer 9 is connected to the label printer 1 via a communication line S. The host computer 9 is also connected to the wireless tag attaching device 5 via a communication line W.

Figure 12:
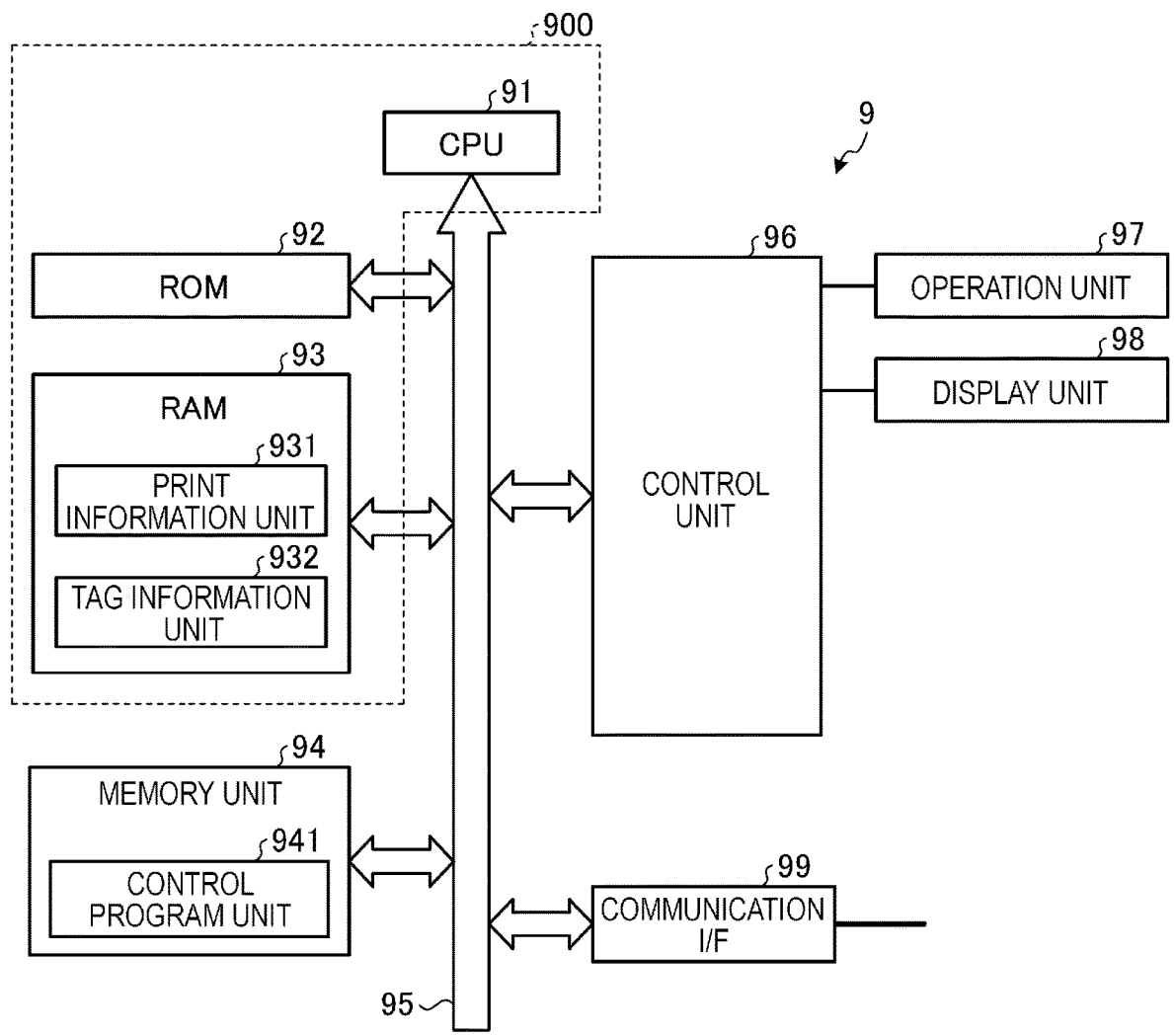
FIG. 12 is a block diagram illustrating a hardware configuration of a host computer.

Next, the hardware of the host computer 9 will be described. FIG. 12 is a block diagram illustrating a hardware configuration of the host computer 9. As illustrated in FIG. 12, the host computer 9 includes a CPU 91 (host processor) as an example of a processor, a ROM 92, a RAM 93, a memory unit 94, and the like. The CPU 91 is a control main body. The ROM 92 stores various programs. The RAM 93 loads programs and various data. The memory unit 94 stores various programs. The CPU 91, the ROM 92, the RAM 93, and the memory unit 94 are connected to each other via a bus 95. A host control unit 900 includes the CPU 91, the ROM 92, and the RAM 93. That is, the host control unit 900 executes controlling of the host computer 9 described below, by the CPU 91 operating according to the control program stored in the ROM 92 and the memory unit 94 and loaded into the RAM 93. That is, the CPU 91 executes controlling of the host computer 9 described below, by operating according to the control program stored in the ROM 92 and the memory unit 94 and loaded into the RAM 93.

The RAM 93 includes a print information unit 931 (host storage unit) and a tag information unit 932 (host storage unit). The print information unit 931 stores print information to be printed on the label 201. The tag information unit 932 stores tag information to be transmitted to the wireless tag attaching device 5.

The memory unit 94 includes an HDD, a flash memory, or the like, which retains stored data upon power off. The memory unit 94 includes a control program unit 941. The control program unit 941 stores a control program for controlling the host computer 9.

Further, the host control unit 900 is connected to an operation unit 97 and a display unit 98 via the bus 95 and a control unit 96.

The operation unit 97 is a keyboard for operating the host computer 9. The display unit 98 displays information related to the host computer 9 to the operator.

In addition, the host control unit 900 is connected to a communication interface (I/F) 99 (tag information reception unit) via the bus 95. The host control unit 900 can transmit and receive information with the label printer 1 via the communication interface 99 and the communication line S. In addition, the host control unit 900 can transmit and receive information with the wireless tag attaching device 5 via the communication interface 99 and the communication line W.

Figure 13:
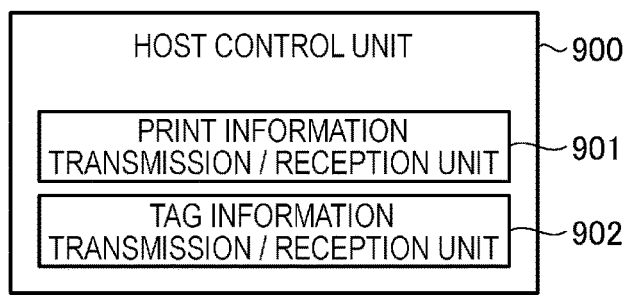
FIG. 13 is a functional block diagram illustrating a functional configuration of a host computer.

Hereinafter, the functional configuration of the host computer 9 will be described. FIG. 13 is a functional block diagram illustrating the functional configuration of the host computer 9. The host control unit 900 (that is, the CPU 91) of the host computer 9 operates according to the control program stored in the control program unit 941 to function as follows.

That is, the host control unit 900 has a function of transmitting the print information to the label printer 1. Specifically, the host control unit 900 serves as a print information transmission/reception unit 901 that transmits the print information stored in the print information unit 931 to the label printer 1. The host control unit 900 also has a function of transmitting the stored tag information to the wireless tag attaching device 5 if issuance information is received from the label printer 1. Specifically, the host control unit 900 serves as a tag information transmission/reception unit 902 that transmits the tag information stored in the tag information unit 932 to the wireless tag attaching device 5 if issuance information is received from the label printer 1.

Figure 14:
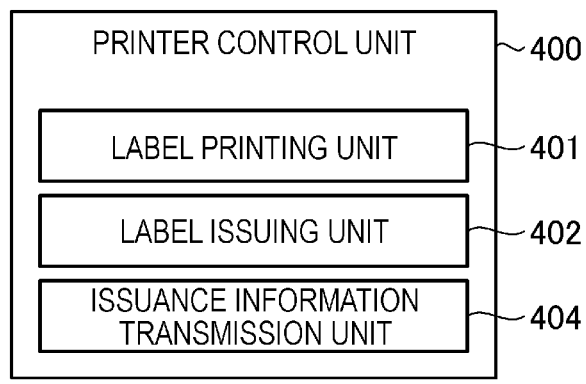
FIG. 14 is a functional block diagram illustrating a functional configuration of a label printer.

Hereinafter, the functional configuration of the label printer 1 will be described. FIG. 14 is a functional block diagram illustrating the functional configuration of the label printer 1. The printer control unit 400 of the label printer 1 serves as the label printing unit 401 and the label issuing unit 402 illustrated in FIG. 6. The printer control unit 400 also has a function of transmitting issuance information indicating that the label 201 is issued to the host computer 9. Specifically, the printer control unit 400 serves as an issuance information transmission unit 404 that transmits issuance information indicating that the label 201 is issued to the host computer 9.

Note that the functional configuration of the wireless tag attaching device 5 according to the second embodiment is the same as that of the first embodiment. That is, the tag control unit 800 serves as the functional configuration (the writing unit 801 and the attaching control unit 802) illustrated in FIG. 7.

Figure 15:
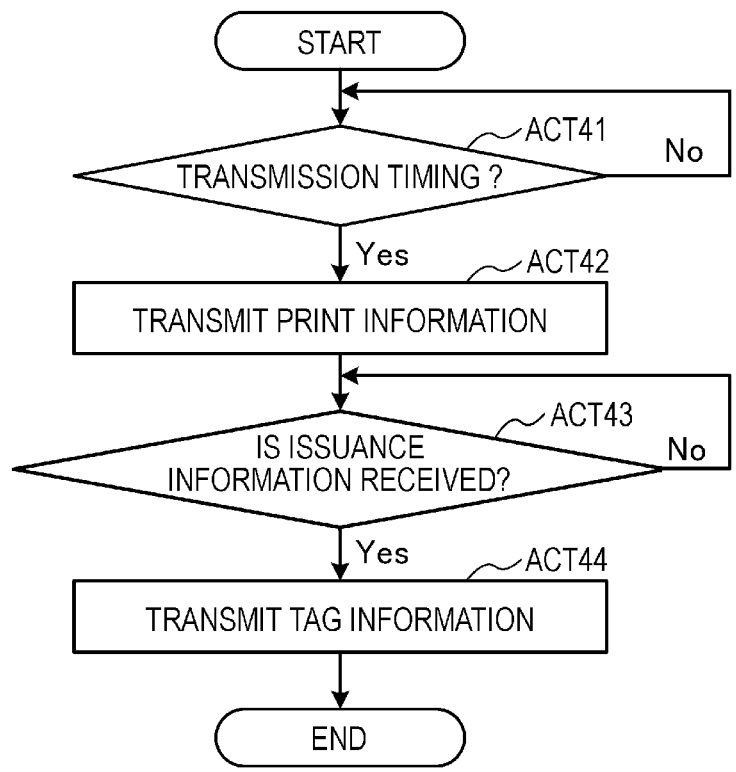
FIG. 15 is a flowchart illustrating a flow of controlling a host computer.

Hereinafter, the control of the host computer 9 will be described. FIG. 15 is a flowchart illustrating a flow of controlling the host computer 9. As illustrated in FIG. 15, the host control unit 900 of the host computer 9 determines a timing to transmit the print information to the label printer 1 (ACT 41). For example, the label printer 1 is caused to issue the label 201 in a transmission timing. After waiting until the transmission timing (No in ACT 41), and when determining that it is the transmission timing (Yes in ACT 41), the print information transmission/reception unit 901 transmits the print information stored in the print information unit 931 for printing on the label 201 to the label printer 1 (ACT 42).

Next, the host control unit 900 determines whether or not issuance information indicating that the print information is printed on the label 201 is received from the label printer 1 (ACT 43). After waiting until the issuance information is received (No in ACT 43), and when determining that the issuance information is received (Yes in ACT 43), the tag information transmission/reception unit 902 transmits the tag information related to the printed print information and stored in the tag information unit 932 to the wireless tag attaching device 5 (ACT 44). Then, the host control unit 900 ends the process.

Figure 16:
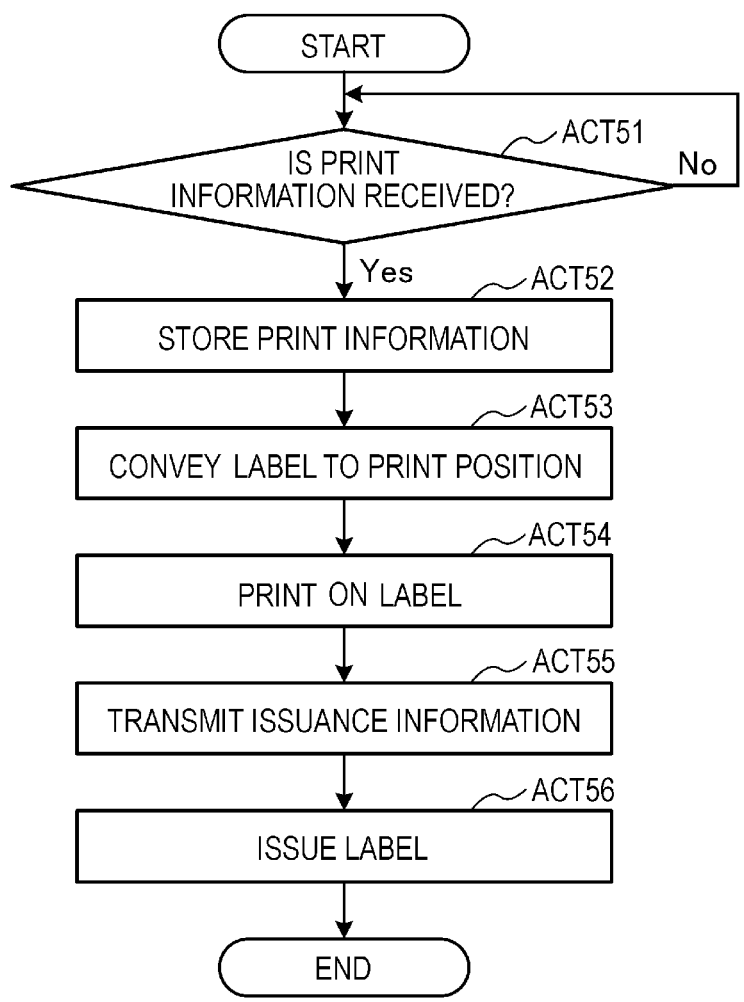
FIG. 16 is a flowchart illustrating a flow of controlling a label printer.

Next, the control of the label printer 1 will be described. FIG. 16 is a flowchart illustrating a flow of controlling the label printer 1. As illustrated in FIG. 16, the printer control unit 400 of the label printer 1 determines whether or not the communication interface 49 receives the print information transmitted from the host computer 9 (ACT 51). After waiting until the print information is received (No in ACT 51), and when determining that the communication interface 49 receives the print information (Yes in ACT 51), the printer control unit 400 stores the received print information in the print information unit 431 (ACT 52).

Next, the printer control unit 400 drives the platen 31 and the like to convey the label 201 pulled out from the label paper 20 to a position for printing by the print head 32 (ACT 53). After the label detection sensor 57 detects the label 201, the printer control unit 400 conveys the detected label 201 by a predetermined distance so as to convey the label 201 to the position for printing by the print head 32. Then, the label printing unit 401 prints the print information on the front surface side of the conveyed label 201 (ACT 54).

Next, the tag information transmission unit 403 transmits issuance information indicating that the print information is printed on the label 210 to the host computer 9 (ACT 55). Then, the label issuing unit 402 issues, from the label issuing port 10, the label 201 which is printed with the print information but not yet attached with the wireless tag 611 (ACT 56). Then, the printer control unit 400 ends the process.

Note that the control of the wireless tag attaching device 5 according to the second embodiment is the same as that of the first embodiment, and the processes in FIG. 9 are executed. However, the tag information whose reception is determined in ACT 22 is transmitted from the host computer 9.

If the label 201 printed with the print information enters, the wireless tag attaching device 5 of the second embodiment writes the tag information related to the print information to the pulled-out wireless tag 611, and attaches the wireless tag 611 on the front surface side of the entered label 201. Therefore, it is possible to form a wireless tag label without using a tag roll paper.

In the system of the second embodiment, the host computer 9 transmits the print information to the label printer 1, and the label printer 1 receiving the print information prints the print information on the front surface side of the pulled-out label 201 and issues the label. If the label 201 issued by the label printer 1 enters, the wireless tag attaching device 5 writes the tag information related to the print information on the pulled-out wireless tag 611, and attaches the wireless tag 611 on the front surface side of the entered label 201. Therefore, it is possible to form a wireless tag label without using a tag roll paper.

As described above, the wireless tag attaching device 5 according to the first and second embodiments includes the wireless tag holding unit 612 configured to set the tag roll sheet 61 that includes a plurality of wireless tags 611 wound in a roll, the head 64 provided on the first conveyance path for conveying the wireless tag 611 pulled out from the set tag roll sheet 61, in which the head 64 is configured to write tag information to the wireless tag 611, the label detection sensor 52 provided on the second conveyance path for conveying the label 201 printed with the print information on the front surface side thereof, in which the label detection sensor 52 is configured to detect the label 201 entering the second conveyance path from the outside, the attaching unit 66 provided at a position accessible to the first conveyance path and the second conveyance path, in which the attaching unit 66 is configured to attach the wireless tag 611 written with the tag information by the head 64 to the label 201, the communication interface 89 configured to receive tag information related to print information, and the CPU 81, in which the CPU 81 controls the head 64 to write the tag information received by the communication interface 89 to the wireless tag 611, and controls the attaching unit 66 to attach the wireless tag 611 completed with writing to the label 201 that is detected as entering by the label detection sensor 52.

Since the wireless tag attaching device 5 according to the first and second embodiments attaches the wireless tag 611 written with the tag information on the label 201 printed with the print information, it is possible to form the wireless tag label without using the tag roll paper.

Further, in the wireless tag attaching device 5 according to the first and second embodiments, if the head 64 fails to correctly write the tag information to the wireless tag 611 (if writing failure occurs), the CPU 81 discards the corresponding wireless tag 611 in the disposal box 67.

In the wireless tag attaching device 5 according to the first and second embodiments, even if the wireless tag 611 has the writing failure of tag information, the label 201 is not discarded, thereby preventing the label 201 from being wasted.

The system according to the first embodiment is the system 30 including the label printer 1 and the wireless tag attaching device 5, in which the label printer 1 includes the communication interface 49 configured to receive the print information to be printed on the label 201 and the tag information to be written to the wireless tag 611, and the print head 32 configured to print the received print information on the label 201, and the CPU 41, in which the CPU 41 prints the received print information on the label 201 by using the print head 32, issues the printed label 201, and transmits the tag information received together with the print information printed on the issued label 201 to the wireless tag attaching device 5, and the wireless tag attaching device 5 includes the wireless tag holding unit 612 configured to set the tag roll sheet 61 that includes a plurality of wireless tags 611 wound in a roll, the head 64 provided on the first conveyance path for conveying the wireless tag 611 pulled out from the set tag roll sheet 61 and writing tag information to the wireless tag 611, the label detection sensor 52 provided on the second conveyance path for conveying the label 201 printed with the print information on the front surface side thereof, in which the label detection sensor 52 is configured to detect the label 201 entering the second conveyance path from the label printer 1, the attaching unit 66 provided at a position accessible to the first conveyance path and the second conveyance path, in which the attaching unit 66 may be configured to attach the wireless tag 611 written with the tag information by the head 64 to the label 201, the communication interface 89 configured to receive, from the label printer 1, tag information related to print information, and the CPU 81, in which the CPU 81 controls the head 64 to write the tag information received by the communication interface 89 to the wireless tag 611, and controls the attaching unit 66 to attach the wireless tag 611 completed with writing to the label 201 that is detected as entering by the label detection sensor 52.

In the system 30 according to the first embodiment as described above, the label printer 1 prints the print information on the label 201 and issues the label, and the wireless tag attaching device 5 attaches the wireless tag 611 to the label 201 printed with the print information, and accordingly, it is possible to form a wireless tag label without using a tag roll paper.

Further, the system according to the second embodiment is the system 40 including the host computer 9, the label printer 1, and the wireless tag attaching device 5, in which the host computer 9 includes the print information unit 931 configured to store print information to be printed on the label 201, the tag information unit 932 configured to store tag information to be written to the wireless tag in relation to the print information, and the CPU 91, in which the CPU 91 transmits the print information to the label printer 1, and the label printer 1 includes the communication interface 49 configured to receive the print information to be printed on the label 201, the print head 32 configured to print the received print information on the label 201, and the CPU 41, in which the CPU 41 prints the received print information on the label 201 by using the print head 32, issues the printed label 201, and transmits issuance information indicating that the label 201 is issued to the host computer 9, when receiving the issuance information from the label printer 1, the CPU 91 transmits the tag information stored in relation to the print information to the wireless tag attaching device 5, the wireless tag attaching device 5 includes the wireless tag holding unit 612 configured to set the tag roll sheet 61 that includes a plurality of wireless tags 611 wound in a roll, the head 64 provided on the first conveyance path for conveying the wireless tag 611 pulled out from the set tag roll sheet 61, in which the head 64 is configured to write tag information to the wireless tag 611, the label detection sensor 52 provided on the second conveyance path for conveying the label 201 printed with the print information on the front surface side thereof, in which the label detection sensor 52 is configured to detect the label 201 entering the second conveyance path from the label printer 1, the attaching unit 66 provided at a position accessible to the first conveyance path and the second conveyance path, in which the attaching unit 66 is configured to attach the wireless tag 611 written with the tag information by the head 64 to the label 201, the communication interface 89 configured to receive, from the host computer 9, tag information related to print information, and the CPU 81, in which the CPU 81 controls the head 64 to write the tag information received by the communication interface 89 to the wireless tag 611, and controls the attaching unit 66 to attach the wireless tag 611 completed with writing to the label 201 that is detected as entering by the label detection sensor 52.

In the system 40 according to the second embodiment as described above, the host computer 9 transmits the print information to the label printer 1, the label printer 1 prints the print information on the label 201 and issues the label, and the wireless tag attaching device 5 attaches the wireless tag 611 to the label 201 printed with the print information, and accordingly, it is possible to form a wireless tag label without using a tag roll paper.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the first and second embodiments have been described with reference to the label 201 as an example of the sheet. However, embodiments are not limited thereto, and the sheet may be a product tag attached as a price tag for clothing items, for example. In this case, instead of the label printer 1, a tag printer that prints the print information on the product tags is used.

For example, the first and second embodiments have been described with reference to the cylinder 666 and the suction unit 661 as the attaching unit for attaching the wireless tag 611. However, embodiments are not limited thereto, and for example, an arm may be used to grasp and attach the wireless tag 611 to the label 201, or another known method may be used to attach the wireless tag 611 to the label 201.

What is claimed is:

1. A wireless tag attaching device, comprising:
    a setting component configured to set a tag roll sheet that includes a plurality of wireless tags wound in a roll;
    a head provided on a first conveyance path for conveying a wireless tag pulled out from the set tag roll sheet, wherein the head is configured to write tag information to the wireless tag;
    an entry detector provided on a second conveyance path for conveying a sheet printed with print information on a front surface thereof, wherein the entry detector is configured to detect the sheet entering the second conveyance path from outside;
    an attaching component provided at a position accessible to the first conveyance path and the second conveyance path, wherein the attaching component is configured to attach the wireless tag written with the tag information by the head to the sheet;
    a tag information reception component configured to receive tag information related to the print information; and
    a tag processor configured to:
        control the head to write the tag information received by the tag information reception component to the wireless tag; and
        control the attaching component to attach the wireless tag completed with writing to the sheet that is detected as entering by the entry detector.

2. The wireless tag attaching device according to claim 1, wherein, if the entry detector detects the sheet entering, the tag processor determines whether or not the tag information reception component receives the tag information, and if the tag information reception component receives the tag information, the tag processor writes the tag information to the wireless tag.

3. The wireless tag attaching device according to claim 1, further comprising a disposal component,
    wherein, if the head fails to correctly write the tag information to the wireless tag, the tag processor discards the corresponding wireless tag in the disposal component.

4. The wireless tag attaching device according to claim 3, wherein the attaching component includes a cylinder for moving the wireless tag to an attaching position on the sheet and to the disposal component.

5. The wireless tag attaching device according to claim 1, wherein the tag processor attaches the wireless tag to the front surface of the sheet.

6. The wireless tag attaching device according to claim 1, wherein the tag processor attaches the wireless tag to a back surface of the sheet.

7. The wireless tag attaching device according to claim 1, wherein the attaching component includes a cylinder for moving the wireless tag to an attaching position on the sheet.

8. A system comprising a printer and a wireless tag attaching device, wherein the printer includes:
    a reception component configured to receive print information to be printed on a sheet and tag information to be written to a wireless tag;
    a print head configured to print the received print information on the sheet; and
    a printer processor, wherein
    the printer processor is configured to print the received print information on the sheet by using the print head, issue the printed sheet, and transmit the tag information received together with the print information printed on the issued sheet to the wireless tag attaching device, and
    the wireless tag attaching device includes:
    a setting component configured to set a tag roll sheet that includes a plurality of wireless tags wound in a roll;
    a head provided on a first conveyance path for conveying a wireless tag pulled out from the set tag roll sheet, wherein the head is configured to write tag information to the wireless tag;
    an entry detector provided on a second conveyance path for conveying a sheet printed with print information on a front surface thereof, wherein the entry detector is configured to detect the sheet entering the second conveyance path from the printer;
    an attaching component provided at a position accessible to the first conveyance path and the second conveyance path, wherein the attaching component is configured to attach the wireless tag written with the tag information by the head to the sheet;
    a tag information reception component configured to receive tag information related to the print information from the printer; and
    a tag processor configured to:
        control the head to write the tag information received by the tag information reception component to the wireless tag; and
        control the attaching component to attach the wireless tag completed with writing to the sheet that is detected as entering by the entry detector.

9. The system according to claim 8, wherein, if the entry detector detects the sheet entering, the tag processor determines whether or not the reception component receives the tag information, and if the reception component receives the tag information, the tag processor writes the tag information to the wireless tag.

10. The system according to claim 8, further comprising a disposal component,
wherein, if the head fails to correctly write the tag information to the wireless tag, the tag processor discards the corresponding wireless tag in the disposal component.

11. The system according to claim 10, wherein the attaching component includes a cylinder for moving the wireless tag to an attaching position on the sheet and to the disposal component.

12. The system according to claim 8, wherein the tag processor attaches the wireless tag to the front surface of the sheet.

13. The system according to claim 8, wherein the tag processor attaches the wireless tag to a back surface of the sheet.

14. The system according to claim 8, wherein the attaching component includes a cylinder for moving the wireless tag to an attaching position on the sheet.

15. A system comprising a host computer, a printer, and a wireless tag attaching device, wherein the host computer includes:
a host storage component configured to store print information to be printed on a sheet and tag information to be written to a wireless tag in relation to the print information; and
a host processor configured to transmit the print information to the printer,
the printer includes:
a reception component configured to receive print information to be printed on a sheet;
a print head configured to print the received print information on the sheet; and
a printer processor configured to print the received print information on the sheet by using the print head, issue the printed sheet, and transmit issuance information indicating that the sheet is issued to the host computer,
the host processor is configured to transmit the tag information stored in relation to the print information to the wireless tag attaching device when receiving the issuance information from the printer, and
the wireless tag attaching device includes:
a setting component configured to set a tag roll sheet that includes a plurality of wireless tags wound in a roll;
a head provided on a first conveyance path for conveying a wireless tag pulled out from the set tag roll sheet, wherein the head is configured to write tag information to the wireless tag;
an entry detector provided on a second conveyance path for conveying a sheet printed with print information on a front surface thereof, wherein the entry detector is configured to detect the sheet entering the second conveyance path from the printer;
an attaching component provided at a position accessible to the first conveyance path and the second conveyance path, wherein the attaching component is configured to attach the wireless tag written with the tag information by the head to the sheet;
a tag information reception component configured to receive tag information related to the print information from the host computer; and
a tag processor configured to:
control the head to write the tag information received by the tag information reception component to the wireless tag; and
control the attaching component to attach the wireless tag completed with writing to the sheet that is detected as entering by the entry detector.

16. The system according to claim 15, wherein, if the entry detector detects the sheet entering, the tag processor determines whether or not the reception component receives the tag information, and if the reception component receives the tag information, the tag processor writes the tag information to the wireless tag.

17. The system according to claim 15, further comprising a disposal component,
wherein, if the head fails to correctly write the tag information to the wireless tag, the tag processor discards the corresponding wireless tag in the disposal component.

18. The system according to claim 15, wherein the tag processor attaches the wireless tag to the front surface of the sheet.

19. The system according to claim 15, wherein the tag processor attaches the wireless tag to a back surface of the sheet.

20. The system according to claim 15, wherein the attaching component includes a cylinder for moving the wireless tag to an attaching position on the sheet.

* * * * *